(12) United States Patent
Yamamoto

(10) Patent No.: US 7,529,035 B2
(45) Date of Patent: May 5, 2009

(54) ZOOM LENS SYSTEM AND IMAGE PICKUP DEVICE

(75) Inventor: Yasushi Yamamoto, Kishiwada (JP)

(73) Assignee: Konica Minolta Opto, Inc., Haichioji-Shi (JP)

( * ) Notice: Subject to any disclaimer, the term of this patent is extended or adjusted under 35 U.S.C. 154(b) by 0 days.

(21) Appl. No.: 12/140,587

(22) Filed: Jun. 17, 2008

(65) Prior Publication Data
US 2008/0316614 A1   Dec. 25, 2008

(30) Foreign Application Priority Data
Jun. 21, 2007   (JP) .............................. 2007-163419

(51) Int. Cl.
G02B 15/14   (2006.01)
G02B 3/02    (2006.01)
G02B 9/34    (2006.01)
G02B 9/00    (2006.01)
G02B 27/64   (2006.01)

(52) U.S. Cl. ....................... 359/686; 359/715; 359/781; 359/740; 359/557

(58) Field of Classification Search ................. 359/676, 359/686, 708, 715, 771, 781, 554, 557, 738–740
See application file for complete search history.

(56) References Cited

U.S. PATENT DOCUMENTS

| 7,085,072 B2 | 8/2006 | Kuba ........................... 359/689 |
| 7,342,727 B2* | 3/2008 | Iwasawa ...................... 359/686 |
| 7,436,600 B1* | 10/2008 | Noda ........................... 359/686 |
| 2007/0024984 A1 | 2/2007 | Iwasawa ...................... 359/680 |

* cited by examiner

*Primary Examiner*—William C Choi
*Assistant Examiner*—Jack Dinh
(74) *Attorney, Agent, or Firm*—Sidley Austin LLP

(57) ABSTRACT

A zoom lens system includes, in order from an object side: a first lens group having negative power, a second lens group having negative power, a third lens group having positive power, and, a fourth lens group having positive power. The position of the first lens group is fixed during zooming, and the third lens group includes three single lenses including, in order from the object side, a third-first single lens having positive power, a third-second single lens having negative power and a third-third single lens having negative power. The zoom lens system satisfies the following conditional expression:

$$0.4 < L3/fw < 1.2$$

where L3 represents the axial air gap distance between the third-second lens and the third-third lens and fw represents the focal length of the entire system of the zoom lens system at a wide angle end position.

20 Claims, 13 Drawing Sheets

EXAMPLE 1

FIG. 12
EXAMPLE 1
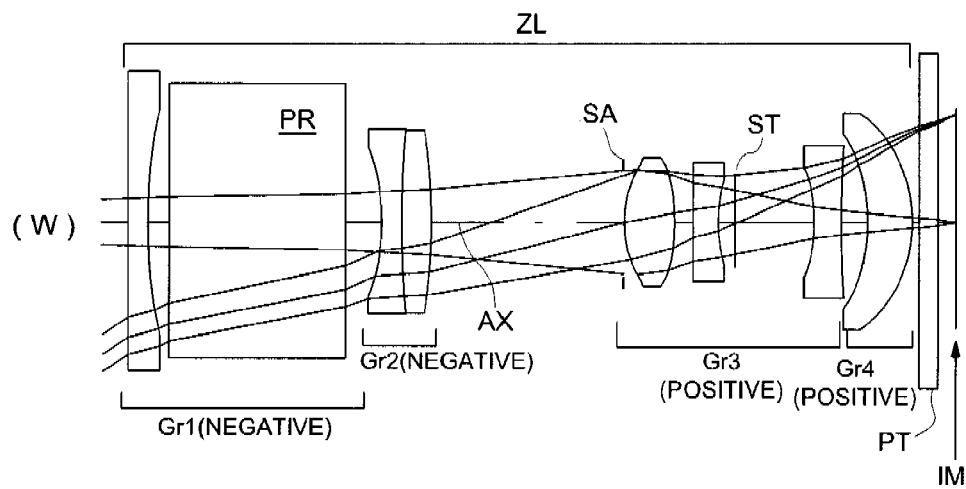
(W)
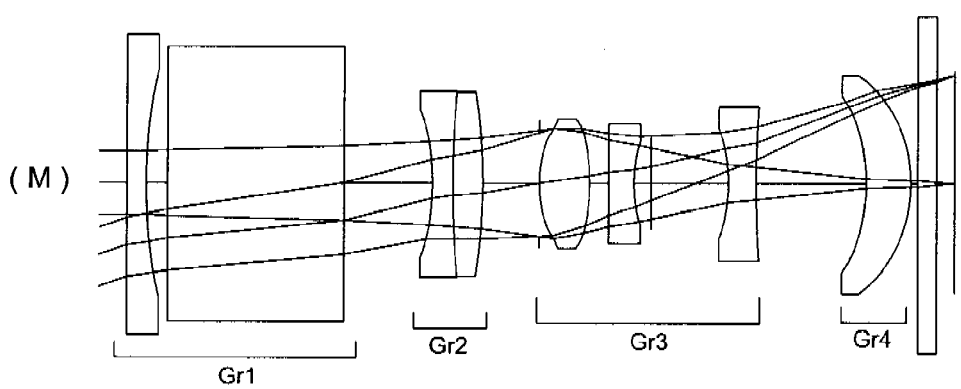
(M)
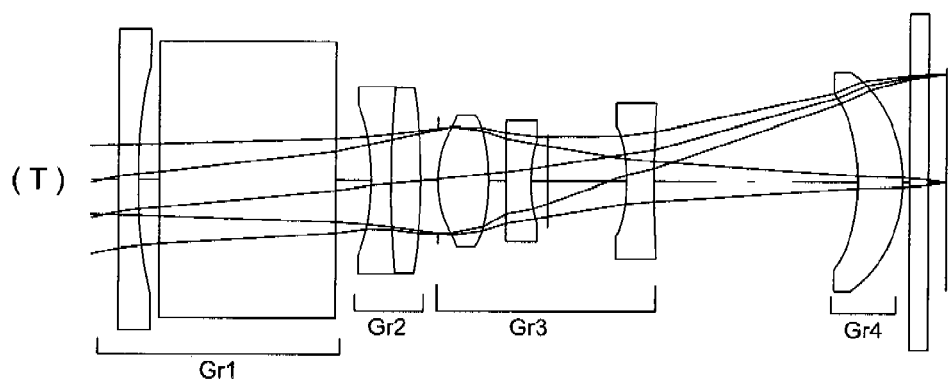
(T)

EXAMPLE 1

ZOOM LENS SYSTEM AND IMAGE PICKUP DEVICE

This application is based on Japanese Patent Application No. 2007-163419 filed on Jun. 21, 2007 in Japanese Patent Office, the entire content of which is hereby incorporated by reference.

BACKGROUND OF THE INVENTION

The present invention relates to a zoom lens and an image pickup device, for example, a zoom lens system used for an optical unit for taking in an image of a photographic object with an image pickup sensor and an image pickup device (especially, an image pickup device which is a main structural element of a camera which is installed inside or outside of a digital camera, a personal computer, a mobile computer, a mobile phone, an information mobile terminal, etc.) equipped with it.

In recent years, a digital camera spreads quickly, and is used not only as a means taking an image into a computer, but also used widely as a means for leaving behind photographs as same as a conventional silver halide film camera. Further, the miniaturization of a camera unit also has progressed with the miniaturization of an image pickup sensor, and a micro camera unit has mounted commonly on a mobile phone. In addition to an object to leave behind photographs, adaptation for a trend to increase the number of pixels and an enlargement of a zooming region has been requested strongly as the specification of an image pickup optical system.

As one of the means for satisfying these requests, U.S. Pat. No. 7,085,072B2 and US 2007/0024984A1 has proposed a zoom lens which is designed to be miniaturized with the structure that a first lens group having a positive power, a second lens group having a negative power, a third lens group having a positive power and a fourth lens group having a positive power are arranged in this order from the object side.

The zoom lens proposed in U.S. Pat. No. 7,085,072B2 and US 2007/0024984A1 includes a reflecting surface to bend a light flux by almost 90° in the first lens group and attains changeable magnifications of two times to three times. However, there is a problem that a size of the optical system is relatively large.

The present invention has been conceived in view of the above circumstances, and its object is to provide a zoom lens system which achieves the miniaturization and has a changeable magnification of about three times.

SUMMARY OF THE INVENTION

In order to attain the above-mentioned object, the zoom lens system according to the invention is a zoom lens system which includes, in order from an object side, a first lens group having a negative optical power, a second lens group having a negative optical power, a third lens group having a positive optical power, and a fourth lens group having a positive optical power, the zoom lens system is characterized in that the position of the above-mentioned first lens group remains fixed during zooming, the third lens group consists of three lenses of a single lens having a positive optical power, a single lens having a negative optical power, a single lens having a negative optical power in order from the object side, and when the three single lenses constituting the above third lens group are represented with a third-first lens, a third-second lens, and a third-third lens in order from the object side, the following conditional expression is satisfied, $$0.4 < L3/fw < 1.2$$

where L3 represents an axial air space distance between the third-second lens and the third-third lens, and fw represents a focal length of an entire system at a wide angle end.

BRIEF DESCRIPTION OF THE DRAWINGS

FIG. 12 is an optical path diagram showing the first embodiment (Example 1) with optical cross section on an optical path developed condition;

DETAILED DESCRIPTION OF THE PREFERRED EMBODIMENT

Figure 1:
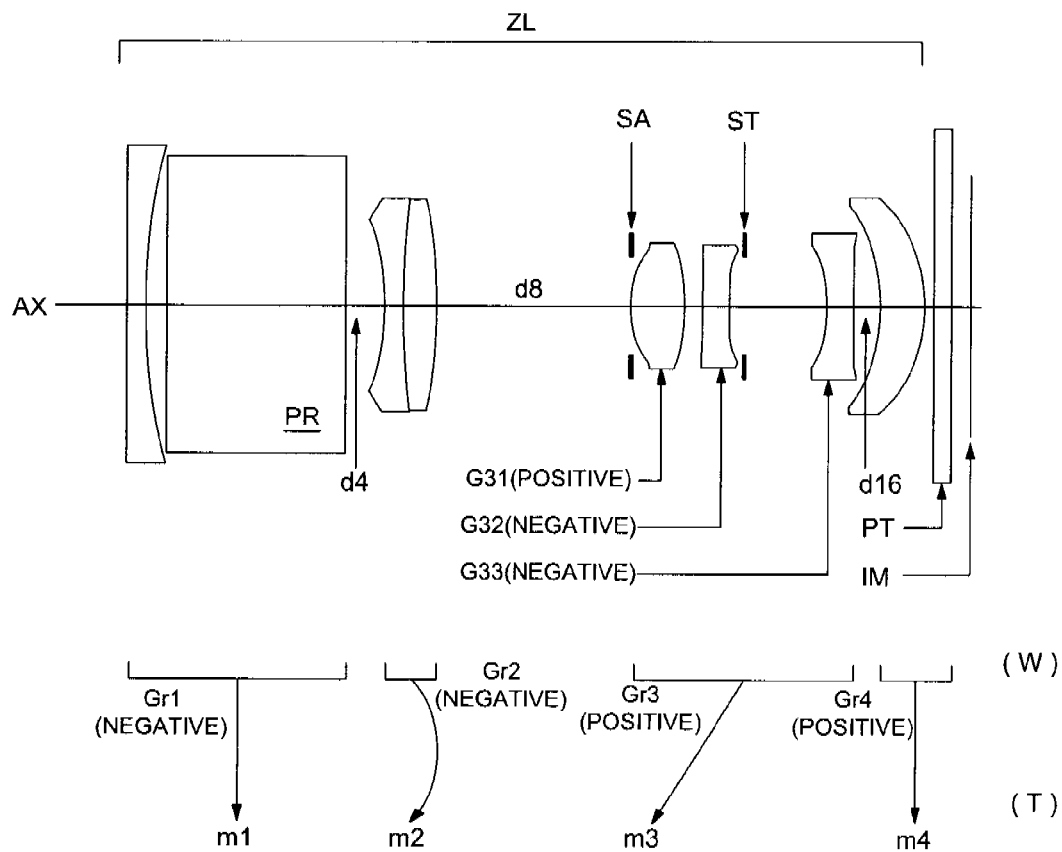
FIG. 1 is a lens constitutional diagram of the first embodiment (Example 1)
Figure 2:
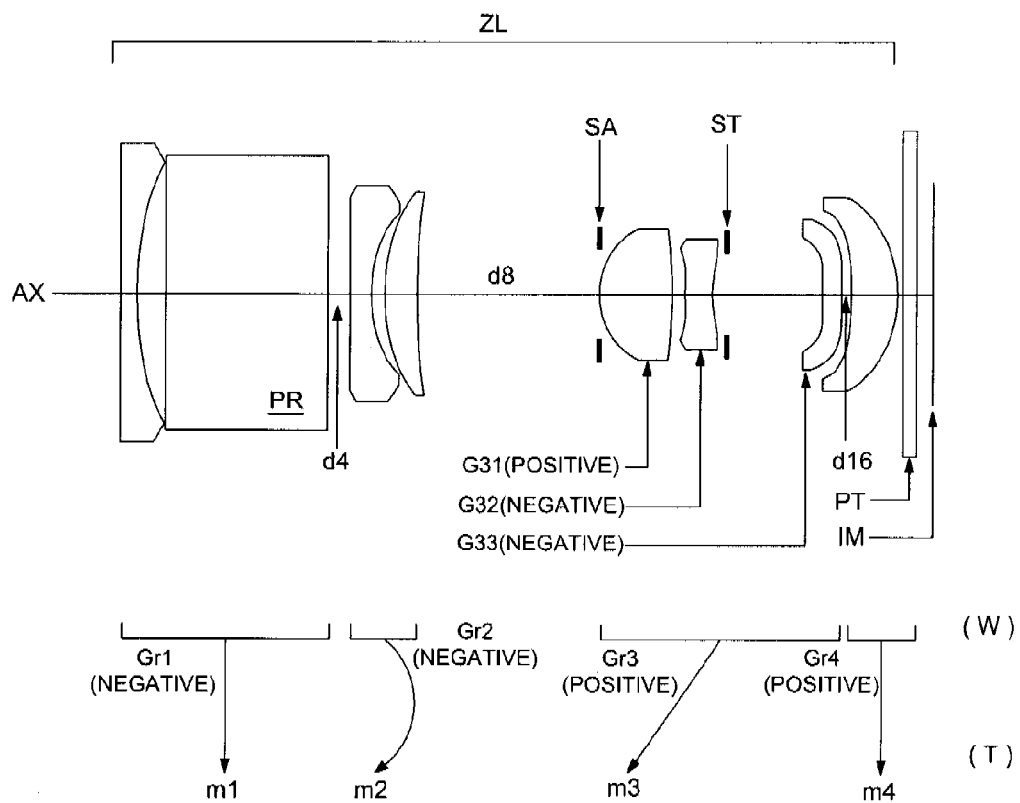
FIG. 2 is a lens constitutional diagram of the second embodiment (Example 2)
Figure 3:
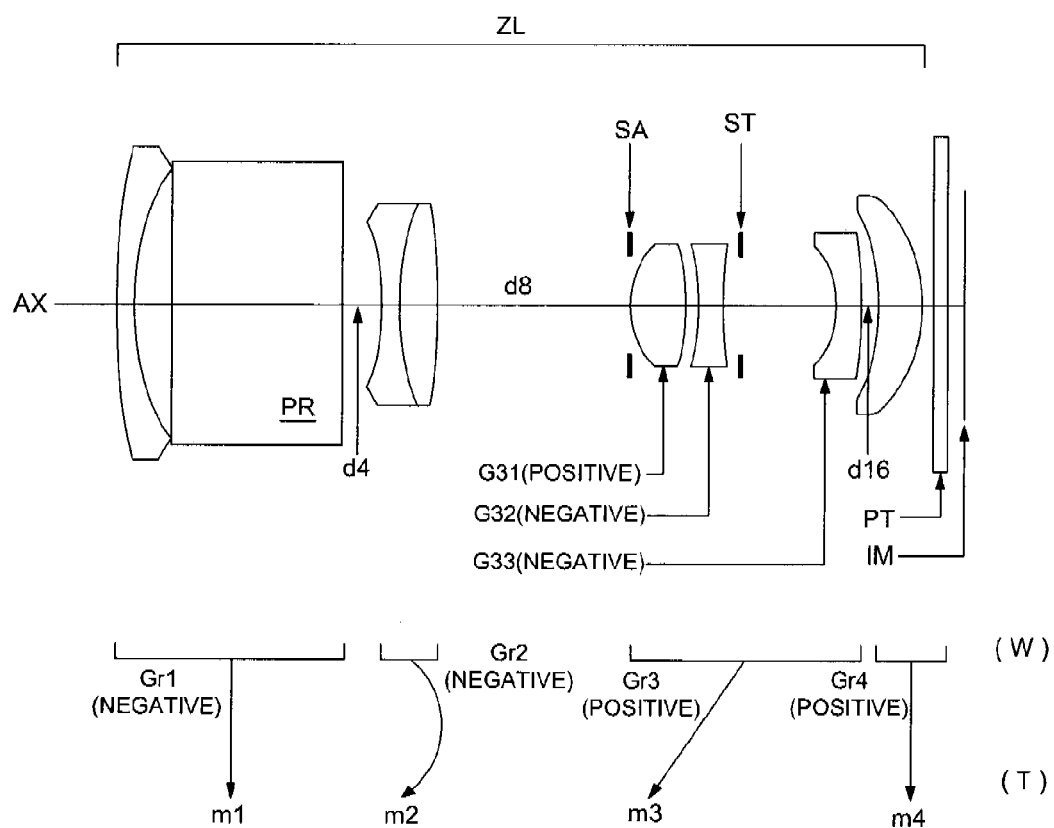
FIG. 3 is a lens constitutional diagram of the third embodiment (Example 3)
Figure 4:
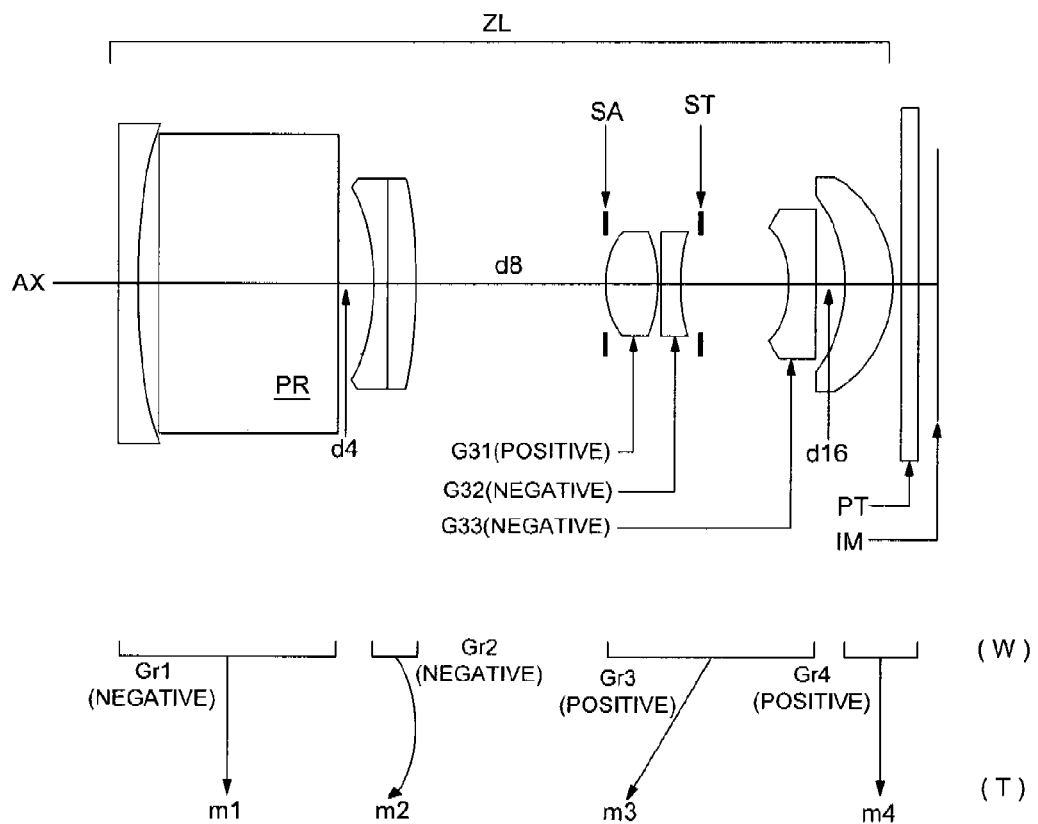
FIG. 4 is a lens constitutional diagram of the fourth embodiment (Example 4)
Figure 5:
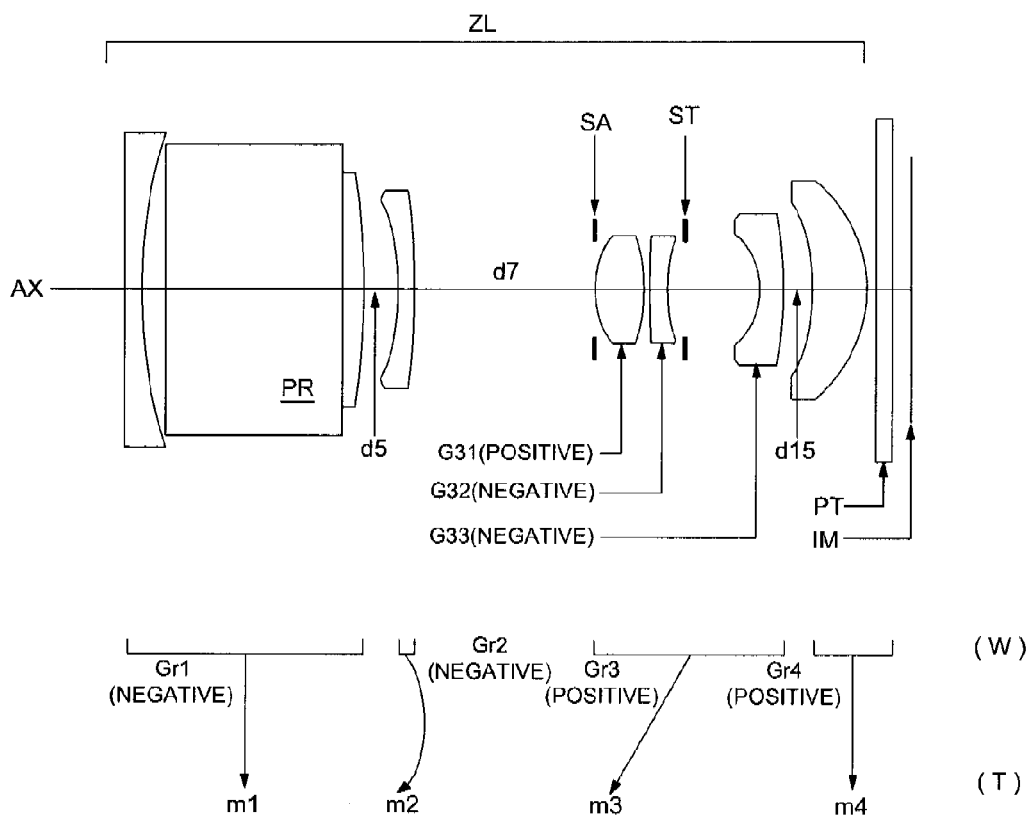
FIG. 5 is a lens constitutional diagram of the fifth embodiment (Example 5)
Figure 6:
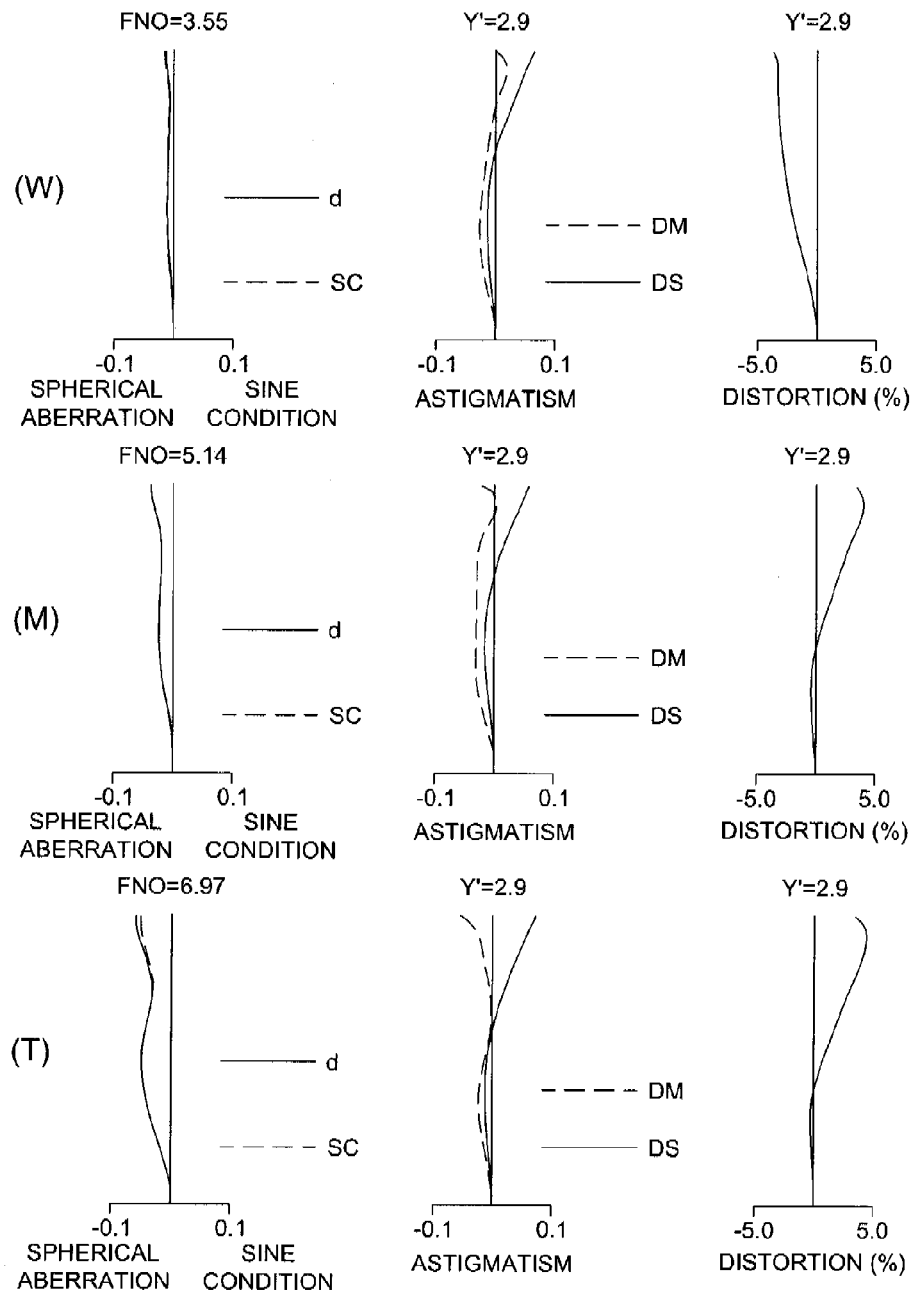
FIG. 6 is an aberration diagram of Example 1.
Figure 7:
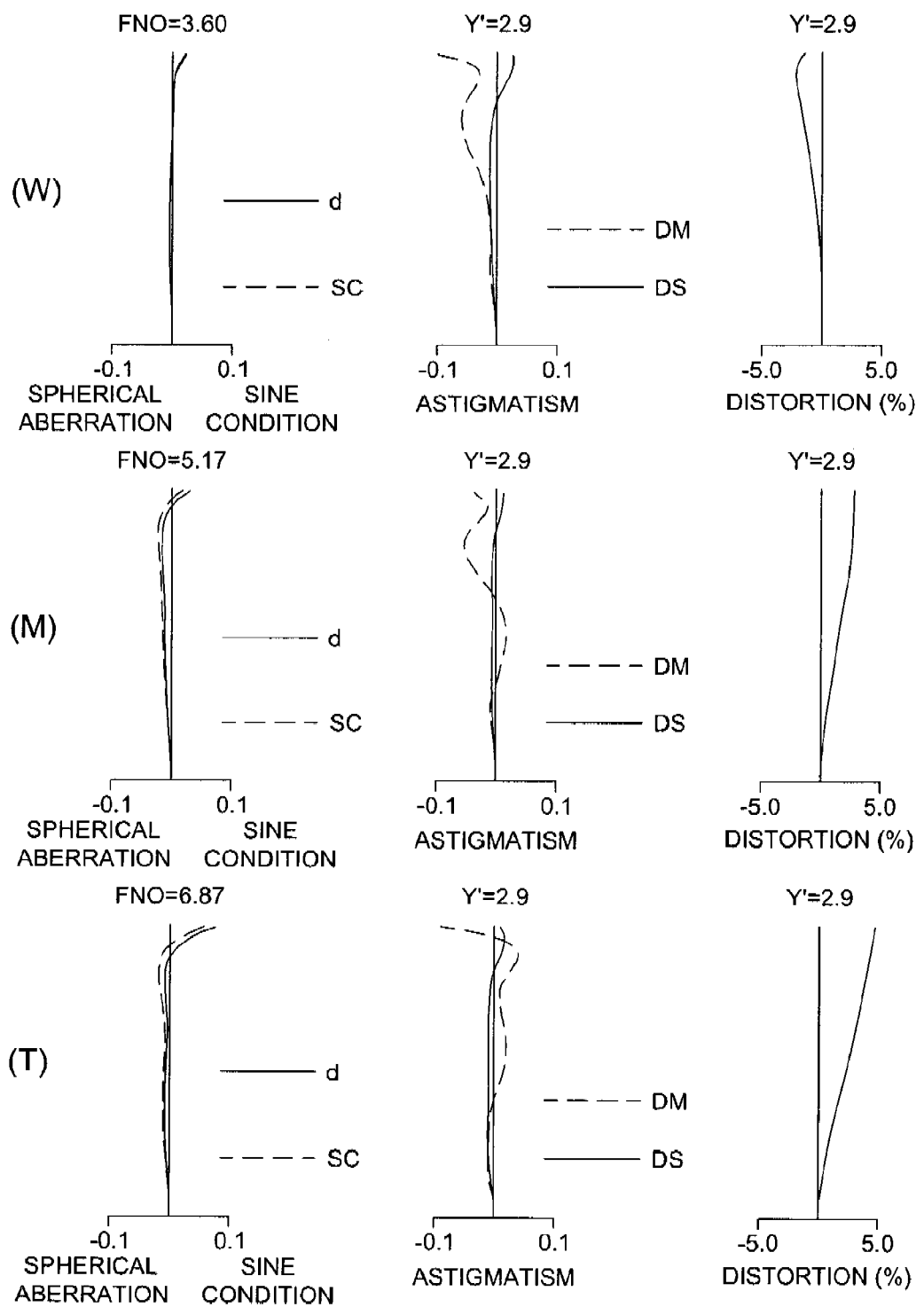
FIG. 7 is an aberration diagram of Example 2.
Figure 8:
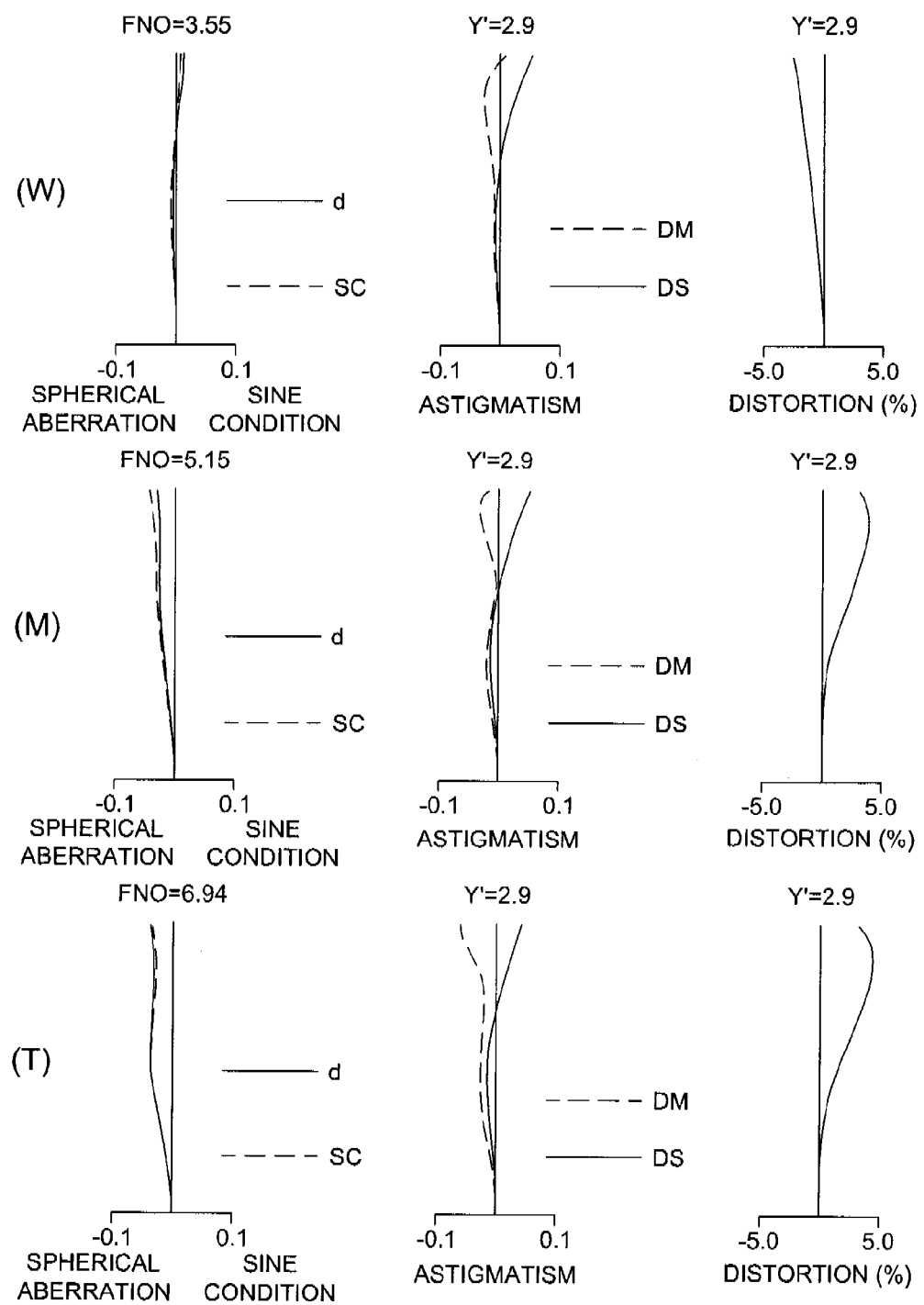
FIG. 8 is an aberration diagram of Example 3.
Figure 9:
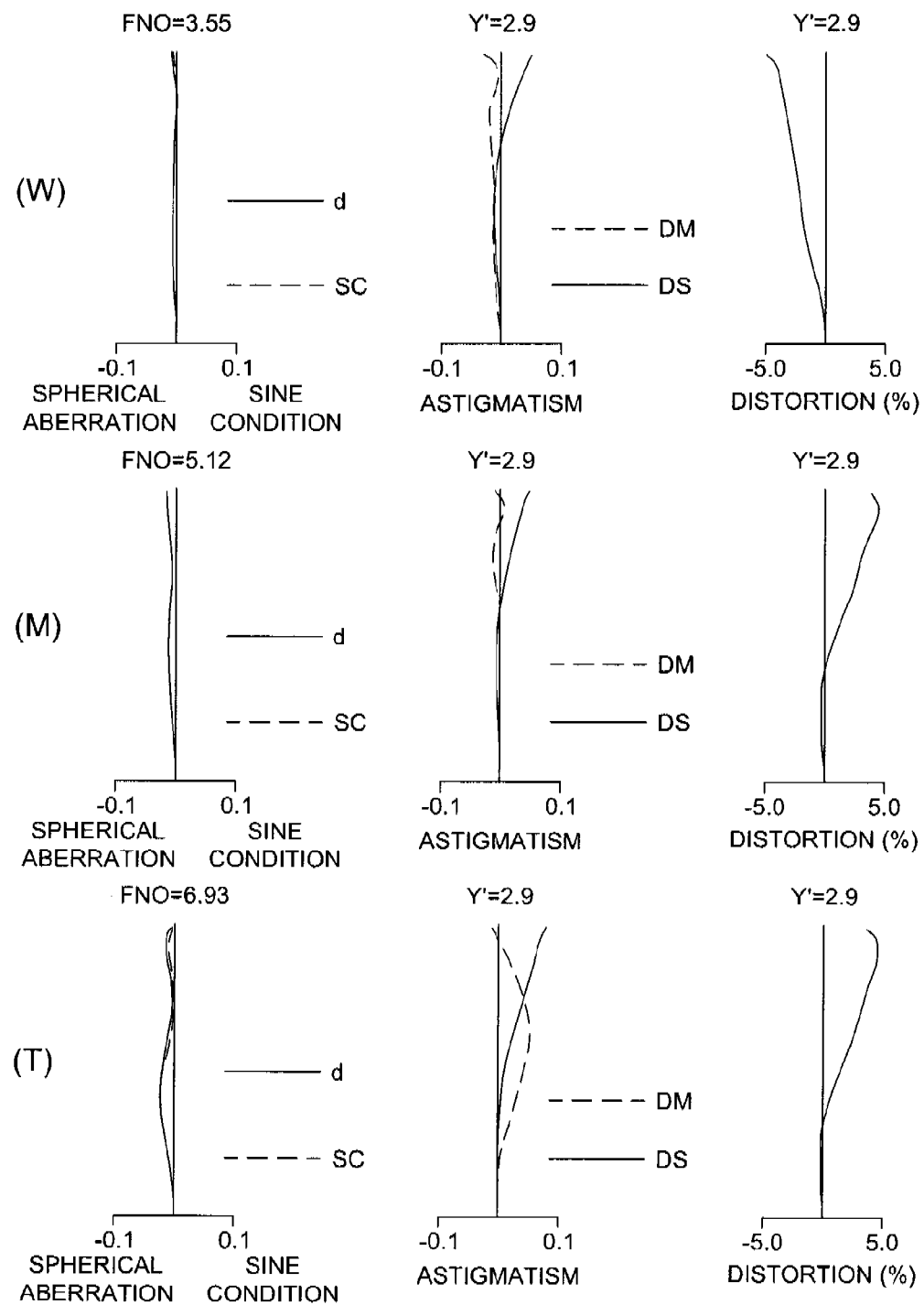
FIG. 9 is an aberration diagram of Example 4.
Figure 10:
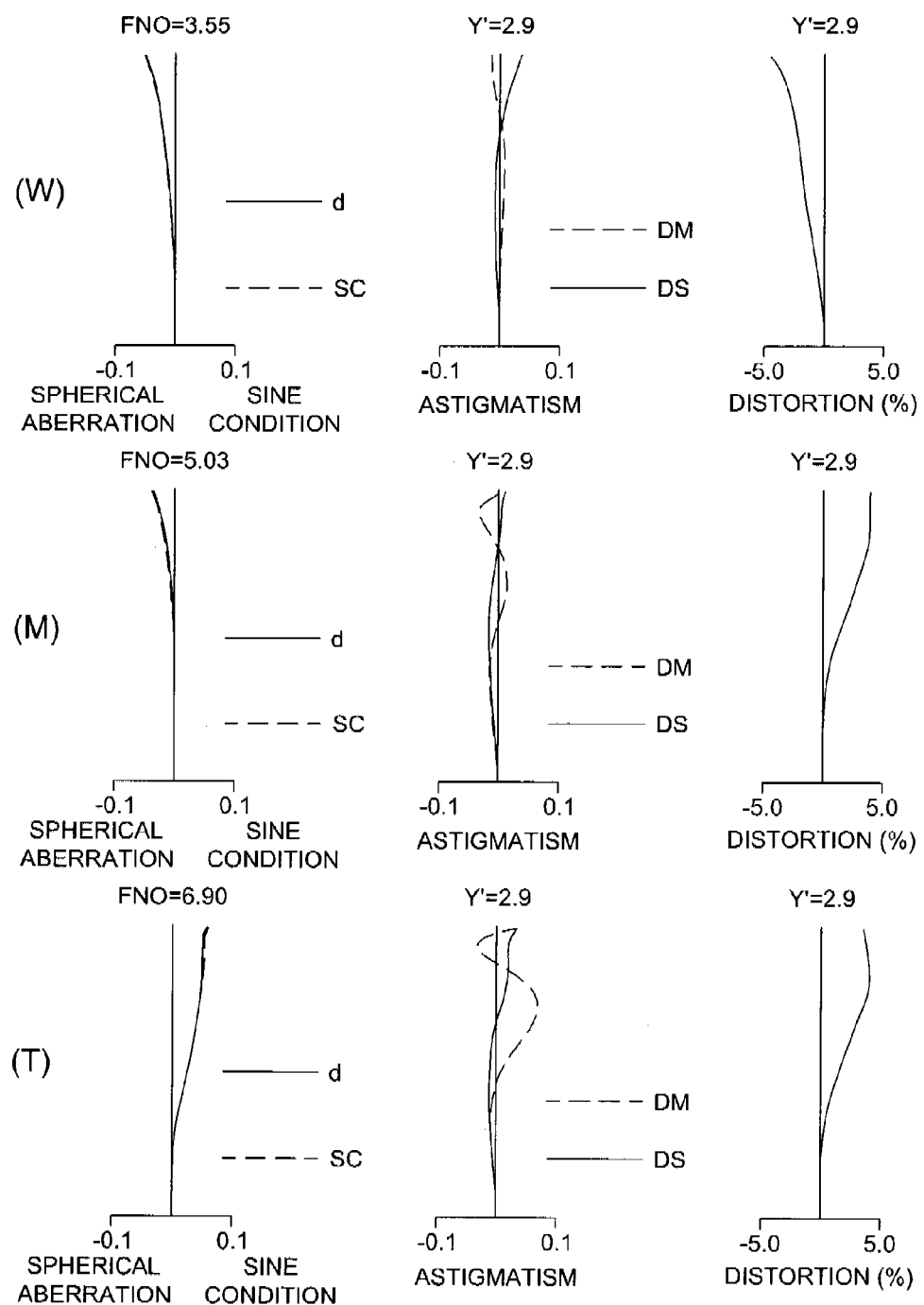
FIG. 10 is an aberration diagram of Example 5.

Hereinafter, preferable embodiments of the present invention are explained, however, the present invention is not limited to these embodiments.

First, a zoom lens system, an image pickup device, and the like according to the present invention are explained with reference to drawings.

The zoom lens system according to the invention is a zoom lens system which includes a first lens group having a negative optical power, a second lens group having a negative optical power, a third lens group having a positive optical power, and a fourth lens group having a positive optical power sequentially from an object side, wherein the position of the above-mentioned first lens group is fixed during zooming, and the third lens group consists of three lenses of a single lens having a positive optical power, a single lens having a negative optical power, a single lens having a negative optical power sequentially from the object side.

Further, when the three single lenses constituting the above third lens group are represented with a third-first lens, a third-second lens, and a third-third lens at order from the object side, it is characterized in that the following conditional expression is satisfied, $$0.4 < L3/fw < 1.2 \tag{1}$$

where L3 represents an axial air space distance between the third-second lens and the third-third lens, and fw represents a focal length of an entire system at a wide angle end.

In order to make a lens overall length not changed at the time of changing magnification, the position of the first lens group is fixed during zooming as mentioned above. The second lens group has a role of compensator and the third lens group mainly achieves changeable magnification. In order to attain the miniaturization, the power of the third lens group is made relatively strong. Further, the fourth lens group has a positive power and has a work to bring an exit pupil position close to the object side.

The third lens group consists of three lenses of positive one, negative one and negative one sequentially from the object side, and when the zoom lens system is made to satisfy the conditional expression (1), an air space distance between the third-second lens and the third-third lens is set as a suitable size. When an attempt is made to attain a miniaturization, the positive power of the third lens group becomes too strong and the correction of astigmatism and the correction of spherical aberration become difficult. However, if an axial air space distance between the third-second lens and the third-third lens is set properly, it becomes possible to correct astigmatism and spherical aberration effectively. Namely, the third-first lens and the third-second lens mainly conduct the correction of spherical aberration and the third-third lens conducts the correction of astigmatism.

If the value of (L3/fw) exceeds the upper limit of the conditional expression (1), the entire body of the third lens group becomes long too much with a long air space distance L3. As a result, since the overall length of an optical system becomes long, it is not desirable from the viewpoint of attaining the miniaturization of the optical system. On the contrary, if the value of (L3/fw) is less than the lower limit of the conditional expression (1), it is not desirable, because the correction effect of astigmatic in the third-third lens becomes weak.

It is desirable that the third lens group satisfies the following conditional expression (2), $$0.5 < f3/fw < 1.5 \quad (2)$$

where f3 represents the focal length of the third lens group.

The conditional expression (2) specifies a desirable condition range for setting up appropriately the power ratio of the third lens group to the entire system of the zoom lens system and making the zoom lens system a small size. Further, when the zoom lens system satisfies the conditional expression (2), the effect according to the conditional expression (1) becomes remarkable. The lower limit of this conditional formula is a preferred value to correct spherical aberration generated in the third lens group by suppressing the power of the third lens group. On the other hand, the upper limit of this conditional formula is a preferred value to make the moving distance of the third lens group proper and to make the small size.

Moreover, it is more desirable to satisfy the following conditional expression (2a):

$$0.7 < f3/fw < 1.3 \quad (2a)$$

With the structure to satisfy the conditional expression (2a), the above effect is exhibited appreciably.

Further, with regard to the power balance of the third-second lens and the third-third lens, it is desirable to satisfy the following conditional expression (3), $$0.2 < f32/f33 < 2 \quad (3)$$

where f32 represents the focal length of the third-second lens, and f33 represents the focal length of the third-third lens.

The conditional expression (3) specifies a desirable condition range with regard to a focal length ratio of the third-second lens having a negative optical power and the third-third lens having a negative optical power.

If the value of (f32/f33) exceeds the upper limit of the conditional expression (3), since the power of the third-third lens becomes strong too much, the correction of astigmatic becomes difficult.

On the contrary, if the value of (f32/f33) is less than the lower limit of the conditional expression (3), since the power of the third-second lens becomes strong too much, the correction of spherical aberration becomes difficult.

It is desirable that the third-second lens is a both surface aspheric lens. Since the third-first lens bears all the positive power of the third lens group, strong spherical aberration is generated. However, when the both surfaces of the third-second lens are made an aspheric surface, the spherical aberration generated in the third-first lens can be corrected by the aspheric surface at the object side of the third-second lens. Also, astigmatism can be corrected effectively by the aspheric surface at the image side of the third-second lens.

With regard to the surface shape of the third-second lens, it is desirable to satisfy the following conditional expression (4).

$$0.3 < (CR1 - CR2)/(CR1 + CR2) < 2.1 \quad (4)$$

where CR1 represents the radius of curvature at the object side of the third-second lens, and CR2 represents the radius of curvature at the image side of the third-second lens.

The conditional expression (4) specifies a desirable condition range for setting up appropriately the curvature of surfaces at the object side and the image side of the third-second lens.

If the value of $((CR1-CR2)/(CR1+CR2))$ exceeds the upper limit of the conditional expression (4), since the radius of curvature of the image side surface of the third-second lens becomes too large and the position of a principal-point moves close to the object side too much, a light flux in the third lens group becomes large. As a result, since a diameter to regulate a light flux becomes large, it is not desirable.

On the contrary, if the value of $((CR1-CR2)/(CR1+CR2))$ is less than the lower limit of the conditional expression (4), since the radius of curvature of the image side surface of the third-second lens becomes small too much, the astigmatism generated in the surface of the image side becomes large. As a result, the correction of the astigmatism becomes difficult.

In a camera unit employing image pickup sensors, such as CCD (Charge Coupled Device) and CMOS (Complementary Metal Oxide Semiconductor) sensors, a light amount adjusting device, such as a shutter and an ND filter, is used. The light amount adjusting device is used for an exposure adjustment at the time of high luminance and is used even at locations other than what is called an optical regulating plane.

For example, in the zoom lens system described in US 2007/0024984A1, a first lens group having a negative power, a second lens group having a negative power, a third lens group having a positive power, a light amount adjusting device, and a fourth lens group having a positive power are arranged in this order from the object side, and it is structured that a light amount adjustment is conducted at a position other than an optical regulating plane.

In the structure of US 2007/0024984A1, a light amount adjusting device is arranged behind a third lens group being a main magnification changing group. Therefore, in order to avoid interference with the fourth lens group, it is necessary to fully secure a space between the third lens group and the fourth lens group. As a result, since the travel distance of the third lens group is restricted, it becomes disadvantageous in terms of the miniaturization of an optical system.

From the above-mentioned viewpoint, it is desirable to have a light amount adjusting device in the third lens group. If the light amount adjusting device is arranged in the third lens group, the interference with other zoom groups can be avoided and the travel distance of the third lens group can fully be secured. Since the travel distance is securable, the enlargement of the power of the third lens group can be reduced. Therefore, it becomes possible to attain the miniaturization of an optical system while securing the good aberration performance.

It is more desirable to have a light amount adjusting device between the third-second lens and the third-third lens. The light amount adjusting device is constituted with plural plate members, such as a shutter plate for light shielding and an ND filter for light amount attenuation though it may change depending on the specifications required of the camera unit. Therefore, the light amount adjusting device needs the thickness in the direction of an optical axis. Also, since a space into which a light flux regulating plate retracts is needed, the size of an aperture diameter becomes large. Accordingly, the size in a direction vertical to the optical axis also becomes large. Therefore, an optical system is requested to make the size of an aperture regulating section smaller.

The third lens group consists of three single lenses of the third-first lens having a positive optical power, the third-second lens having a negative optical power, the third-third lens having a negative optical power, and it is constituted such that a suitable gap can be secured between the third-second lens and the third-third lens. By the structure that the light amount adjusting device is arranged in this gap, the thickness required for the light amount adjusting device can be secured within the third lens group. Moreover, by the structure to give a negative power to the third-third lens, it becomes possible to regulate the width of a light flux including light outside axis to be small within the gap between the third-second lens and the third-third lens. For example, in comparison with the case where the light amount adjusting device is arranged at the image side of the third lens group, the aperture diameter of the light amount adjusting device can be made smaller.

With regard to the power of the third-third lens, it is desirable to satisfy the following conditional expression (5), $$0.5 < |f33/f3| < 5 \qquad (5)$$

where f33 represents the focal length of the third-third lens, and f3 represents the focal length of the third lens group.

The conditional expression (5) specifies a desirable condition range for setting up appropriately the power of the third-third lens having a negative optical power.

If the value of (|f33/f3|) exceeds the upper limit of the conditional expression (5), since the power of the third-third lens becomes weak too much, the width of a light flux spreads too much within the gap between the third-second lens and the third-third lens. Therefore, since the aperture diameter of the light amount adjusting device becomes large, it is not desirable.

On the contrary, if the value of (|f33/f3|) is less than the lower limit of the conditional expression (5), since the power of the third-third lens becomes strong too much, the correction of astigmatic becomes difficult.

Moreover, the third-third lens can be constituted with a resin lens. Since the third-third lens is comparatively close to an image surface, an axial light height is low. Therefore, if the third-third lens is made of a resin material, problems occurring in the case of using the resin material, such as the fluctuation of an image forming position due to temperature change and the deterioration of performance due to a surface precision error, occur hardly. Therefore, it is desirable to constitute the third-third lens with a resin material in terms of cost and a weight.

It is desirable that the first lens group includes a reflecting plane to bend a light flux by approximate 90°. In the zoom lens proposed by U.S. Pat. No. 7,085,0782B2 and US 2007/0024984A1, in order to attain to thin a camera unit in the thickness direction, a reflecting element to bend a light flux by approximate 90° is provided in the first lens group. Also in the zoom lens system according to the present invention, it is possible to attain to thin a camera unit in the thickness direction by providing a reflecting element to bend a light flux by approximate 90° in the first lens group. In the case of thinning the thickness by bending a light flux, it becomes a theme to suppress the thickness of the portion of a reflecting element and the size of the light amount adjusting device in the thickness direction. If the structure of the third lens group mentioned above is adopted, since the aperture diameter of a light flux regulating section can be made small, it becomes possible to suppress the size of the thickness direction of the light amount adjusting device. Therefore, it is possible to thin a camera unit in the thickness direction.

It is desirable that the position of the fourth lens group is fixed during zooming. If the position of the fourth lens group is fixed during zooming, the zoom groups required to be movable during zooming supposing become only the second lens group and the third lens group which are the minimum structure. Therefore, with the structure of making the fourth lens group into a fixed group, it becomes possible to attain the simplification in a mechanical configuration.

It is desirable that the fourth lens group has at least one aspheric surface. With the structure to arrange at least one aspheric surface in the fourth lens group, a distortion aberration and astigmatism can be corrected efficiently.

It is desirable that the fourth lens group is constituted with a lens made of resin. Since the fourth lens group is comparatively close to an image surface, an axial light height is low. Therefore, if the fourth lens group is made of a resin material, problems occurring in the case of using the resin material, such as the fluctuation of an image forming position due to temperature change and the deterioration of performance due to a surface precision error, occur hardly. Therefore, it is desirable to constitute the fourth lens group with a resin material in terms of cost and a weight.

With regard to the negative power of the first lens group, it is desirable to satisfy the following conditional expression (6), $$-4 < f11/fw < -2 \qquad (6)$$

where f11 represents the focal length of the negative lens in the first lens group, and fw represents the focal length of the whole system at the wide angle end.

The conditional expression (6) specifies a desirable condition range for setting up the negative power of the first lens group appropriately.

If the value of (f11/fw) exceeds the upper limit of the conditional expression (6), the negative power of the first lens group becomes strong too much, and it becomes difficult to correct a negative distortion generated in the first lens group.

On the contrary, if the value of (f11/fw) is less than the lower limit of the conditional expression (6), since the negative power of the first lens group becomes weak too much, the effective diameter of the first lens group increases. Therefore, it is not desirable in terms of the miniaturization of an optical system.

Moreover, with regard to the power balance of the first lens group and the second lens group, it is desirable to satisfy the following conditional expression (7).

$$0.5 < f1/f2 < 7 \qquad (7)$$

where f1 represents the focal length of the first lens group, and f2 represents the focal length of the second lens group.

The conditional expression (7) specifies a desirable condition range for setting up appropriately a power ratio of the first lens group and the second lens group.

If the value of (f1/f2) is less than the lower limit of the conditional expression (7), since the power of the first lens group becomes strong too much, it becomes difficult to correct a negative distortion generated in the first lens group.

On the contrary, if the value of (f1/f2) exceeds the upper limit of the conditional expression (7), since the power of the first lens group becomes weak too much, the effective diameter of the first lens group increases. Therefore, it is not desirable in respect of the miniaturization of an optical system.

When a zoom lens system having a changeable magnification of about three times retains the characteristics specified in the present invention while attaining the miniaturization, in the case where, for example, image circle is about 6 mm in diagonal length, it is possible to provide the zoom lens system with a high optical performance over the entire zooming region that a spherical aberration and an image plane curvature are within about 50 μm and a distortion aberration is a maximum of about 5% and to realize a size with an maximum overall length of 30 mm or less. Therefore, according to the present invention, it is possible to realize a small size and high performance zoom lens system having a changeable magnification of about three times and an image pickup device equipped with it. Further, by the application of the image pickup device according to the present invention to a digital device such as a digital camera, it is possible to attribute to make the digital device thin, light, compact, with low cost, high performance, and high function.

The zoom lens system according to the present invention is suitable for the usage as an image pickup optical system for digital equipments with an image input function (for example, a digital camera, a video camera, etc.). Therefore, when the zoom lens system is combined with an image pickup sensor, it can constitute an image pickup device to take in an image of a photographic object and to output the image as electric signals. The image pickup device is an optical device constituting a main structural element of a camera used for a still image photography and moving image photography of a photographic object, and is structured with, in the order from the substance (namely, photographic object), an image pickup optical system to form an optical image of an object and an image pickup sensor to convert the optical image formed by the image pickup optical system into electric signals.

Examples of the camera include a digital camera, a video camera, a surveillance camera, an in-vehicle camera, a camera for videophones, and so on, further include camera installed in or outside of a personal computer, mobile information devices (for example, small and portable information equipment terminal devices such as a mobile computer, a mobile phone, and a mobile information terminal device), peripheral devices (a scanner, a printer, etc.) of these, and other digital devices. As can be seen from these examples, by use of image pickup devices, it is possible to structure a camera. In addition, by installation of image pickup devices into various kinds of devices, it is also possible to add a camera function. For example, it is possible to structure a digital device with an image inputting function such as a camera-fitted mobile phone.

Figure 11:
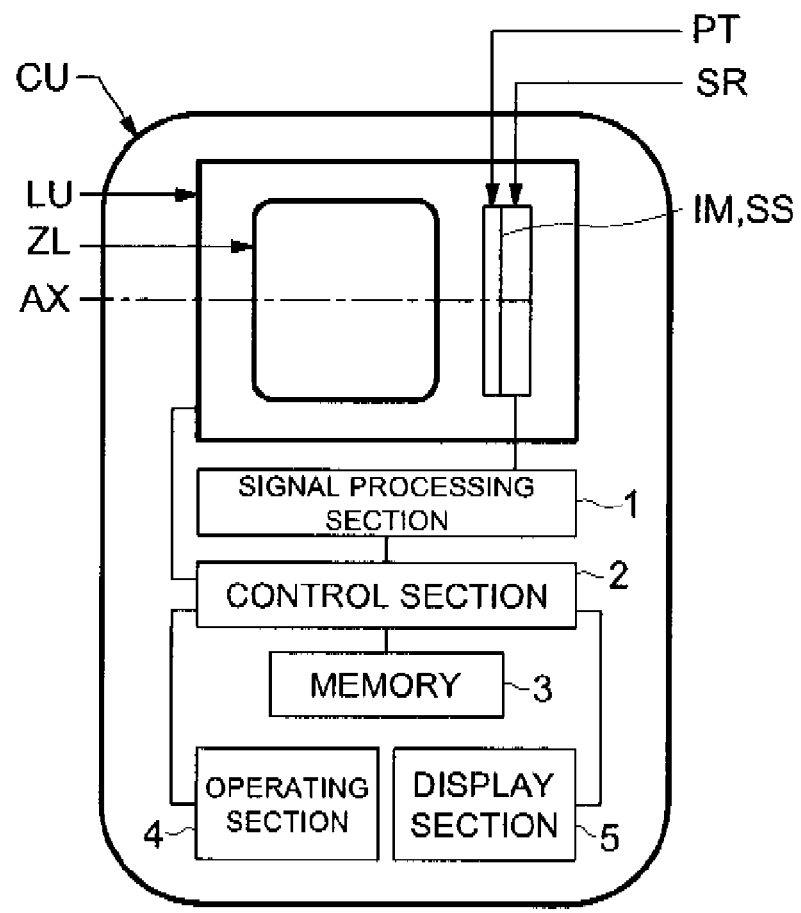
FIG. 11 is a schematic drawing showing an outlined constitutional example of a digital device equipped with an image pickup device.

FIG. 11 shows a schematic cross section of an example of an outline structure of a digital device CU (it is equivalent to a digital device with an image input function, such as a digital camera.). An image pickup device LU installed in the digital device CU shown in FIG. 11 is provided with, sequentially from an object (namely, photographic object) side, a zoom lens system ZL (it is equivalent to an image pickup optical system.) to form an optical image (image surface) IM of an object with changeable magnification; a plane parallel plate PT (an optical filter arranged if needed, such as an optical low pass filter and an infrared cut filter; it is equivalent to a cover glass of an image pickup sensor SR); and an image pickup sensor SR to convert the optical image IM formed on a light receiving surface SS by the zoom lens system ZL into electric signal. In the case that a digital device CU with an image input function is structured with this image pickup device LU, usually, the image pickup device LU is arranged inside a body of the digital device CU. However, in the case of realizing a camera function, it is possible to adopt a configuration according to need. For example, it is possible to structure the image pickup device LU made in a unit so as to be detachable or rotatable for the body of the digital device CU.

As the image pickup sensor SR, for example, a solid state image pickup device, such as CCD having plural pixels and a CMOS sensor are employed. Since the zoom lens system ZL is arranged such that an optical image IM of a photographic object is formed on the light receiving surface SS of the image pickup sensor SR, the optical image IM formed by the zoom lens system ZL is converted into electric signals by the image pickup sensor SR.

The digital device CU is equipped with a signal processing section 1, a control section 2, a memory 3, an operating section 4, and a display section 5 other than the image pickup device LU. The signals generated by image pickup sensor SR are subjected to a predetermined digital image processing and an image compression processing in the signal processing section 1 if needed, and are recorded as digital video signals in the memory 3 (a semiconductor memory, an optical disk, etc.), or are transmitted to other instruments via a cable or by being converted into infrared signals depending on the case. The control section 2 is structured with a microcomputer and controls intensively a photographing function, an image reproducing function, and a lens movement device for zooming and focusing. For example, the control section 2 controls the image pickup device LU to conduct at least one of a still image photography or dynamic image photography of a photographic object. The display section 5 is a section including a display such as a liquid crystal display monitor and the like and performs an image display by using the image signals converted by the image pickup sensor SR or image information recorded in the memory 3. The operating section 4 is a section including operating members, such as a manual operation button (for example, release button) and an operation dial (for example, photography mode dial), and transmits information inputted by an operator with operational input to the control section 2.

The zoom lens system ZL has a zoom constitution including four groups of negative group, negative group, positive group, and positive group, as mentioned above, and is structured such that plural lens groups are made to move along a optical axis AX to change gaps among lens groups in order to conduct changeable magnification (namely, zooming). When an optical image to be formed with the zoom lens system ZL passes through an optical low pass filter (it is equivalent to the plane parallel plate PT in FIG. 11.) having a predetermined cut-off frequency characteristic determined on the basis of a picture element pitch of the image pickup sensor SR, the spatial frequency characteristics of the optical image is adjusted such that so-called turn-back noises generated at the time of being converted into electric signals are minimized, whereby the occurrence of color moire can be suppressed. However, if the performance in the vicinity of a resolution limit frequency is refrained, it may be not necessary to worry about the occurrence of noises even if an optical low pass filter is not used. Moreover, when a user performs photography and appreciation by using a display system (for example, a liquid crystal display of a mobile phone, etc.) in which noises are seldom conspicuous, it is not necessary to use an optical low pass filter.

Figure 13:
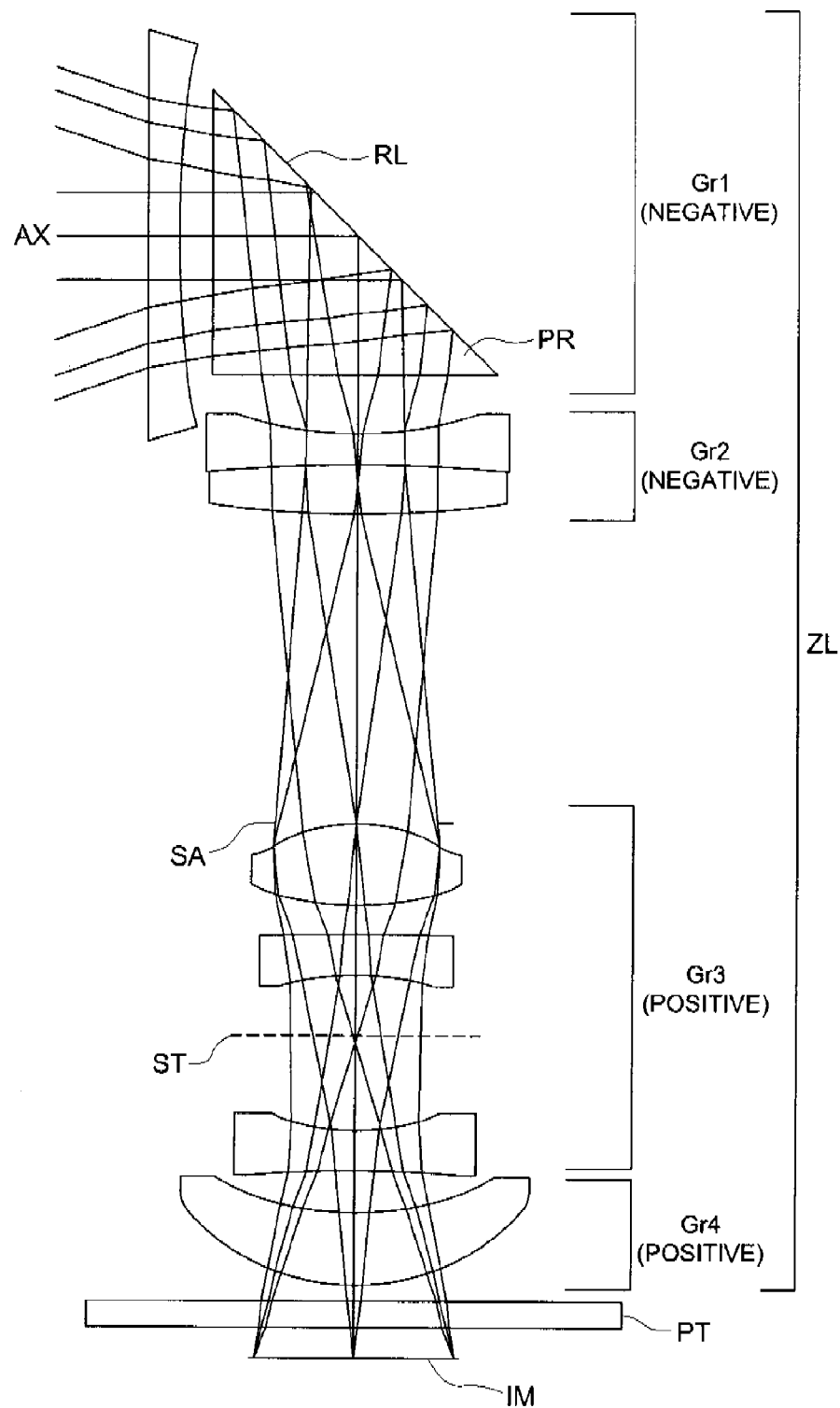
FIG. 13 is an optical path diagram showing the first embodiment (Example 1) with optical cross section on an optical path bent condition.

Next, concrete optical structures of the zoom lens system ZL are explained in more detail with reference to the first to fifth embodiments. FIGS. 1 to 5 show the first to fifth embodiments of the zoom lens system ZL with a lens arrangement at a wide angle end (W). These zoom lens systems ZL are structured as a bending optical system. However, FIGS. 1 to 5 show each lens constitution with an optical cross section on the optical path developed condition that an optical path of the bending optical system is developed. With regard to the first embodiment, the optical cross section on the optical path developed condition is shown in FIG. 12 with lens arrangements of wide angle end (W), intermediate (M) and telephoto end (T), and the optical cross section on the optical path bent condition is shown in FIG. 13 with lens arrangements of wide angle end (W).

The zoom lens system ZL of the first to fifth embodiments is a four group zoom lens of negative group, negative group, positive group, and positive group to form an optical image of an object with changeable magnification for the image pickup sensor SR, and the zooming is conducted by changing gaps among lens groups (for example, in the first to fourth embodiments, surface gaps d4, d8 and d16, and in the fifth embodiments, surface gaps d5, d7 and d15). In FIGS. 1 to 5, arrow marks m1 to m4 show schematically the locus of zoom shifting in each embodiment.

The arrow marks m1 to m4 in FIGS. 1 to 5 show the shifting (that is, change of a relative position to an image surface IM) of the first lens group Gr1 to the fourth lens group Gr4 during zooming from the wide angle end (W) to the telephoto end (T) respectively. However, the arrow marks m1 and m4 show that each position of the first lens group Gr1 and the fourth lens group Gr4 is fixed during the zooming. That is, the first lens group Gr1 and fourth lens group Gr4 are a fixed group, and the second lens group Gr2 and the third lens group Gr3 are a moving group. In the zooming from the wide angle end (W) to the telephoto end (T), the second lens group Gr2 moves to image side and thereafter moves in U-turn from the image side to the object side so as to form the locus of a convex toward the image side, and the third lens group Gr3 moves to the object side monotonously.

In any embodiments, an aperture diaphragm SA (corresponding to aperture stop) and a light amount adjusting device ST are arranged in the third lens group Gr3. Concretely, the aperture diaphragm SA is arranged so as to adjoin the object side of the third-first lens G31, and the light amount adjusting device ST is arranged between the third-second lens G32 and the third-third lens G33. Since the aperture diaphragm SA and the light amount adjusting device ST are structured to move together with the third lens group Gr3 as one unit during zooming (refer to the arrow mark m3 in FIGS. 1 to 5, and FIG. 12.), these can be considered as a part of the third lens group Gr3. The lens constitution of each embodiment is explained in detail below.

In the first embodiment (FIG. 1), each lens group is structured as follows. The first lens group Gr1 is structured with, sequentially from the object side, a negative meniscus lens in which its image side surface is shaped into concave and a prism PR. The second lens group Gr2 is structured with a cemented lens composed of, sequentially from the object side, a biconcave negative lens in which its object side surface is configured with an aspheric surface and a biconvex positive lens. The third lens group Gr3 is structured with, sequentially from the object side, an aperture diaphragm SA, a biaspheric biconvex positive lens (the third-first lens G31) in which its both surfaces are configured with respective aspheric surfaces and the both surfaces are shaped into convex, a biaspheric negative meniscus lens (the third-second lens G32) in which its image side surface is shaped into concave, a light amount adjusting device St, and a biaspheric biconcave negative lens. The fourth lens group Gr4 is structured with a single lens of a biaspheric positive meniscus lens in which its image side is shaped into convex.

In the second embodiment (FIG. 2), each lens group is structured as follows. The first lens group Gr1 is structured with, sequentially from the object side, a negative meniscus lens in which its image side surface is shaped into concave and a prism PR. The second lens group Gr2 is structured with, sequentially from the object side, a biaspheric negative meniscus lens in which its image side surface is shaped into concave and a positive meniscus lens in which its object side surface is shaped into convex. The third lens group Gr3 is structured with, sequentially from the object side, an aperture diaphragm SA, a biconvex positive lens (the third-first lens G31), a biaspheric negative meniscus lens (the third-second lens G32) in which its image side surface is shaped into concave, a light amount adjusting device St, and a biaspheric biconcave negative lens (the third-third lens G33). The fourth lens group Gr4 is structured with a single lens of a biaspheric positive meniscus lens in which its image side surface is shaped into convex.

In the third embodiment (FIG. 3), each lens group is structured as follows. The first lens group Gr1 is structured with, sequentially from the object side, a negative meniscus lens in which its image side surface is shaped into concave and a prism PR. The second lens group Gr2 is structured with a cemented lens composed of, sequentially from the object side, a biconcave negative lens in which its object side surfaces is configured with an aspheric surface and a biconvex positive lens. The third lens group Gr3 is structured with, sequentially from the object side, an aperture diaphragm SA, a biconvex positive lens (the third-first lens G31), a biaspheric biconcave negative lens (the third-second lens G32), a light amount adjusting device St, and a biaspheric biconcave negative lens (the third-third lens G33). The fourth lens group Gr4 is structured with a single lens of a biaspheric positive meniscus lens in which its image side surface is shaped into convex.

In the fourth embodiment (FIG. 4), each lens group is structured as follows. The first lens group Gr1 is structured with, sequentially from the object side, a negative meniscus lens in which its image side surface is shaped into concave and a prism PR. The second lens group Gr2 is structured with a cemented lens composed of, sequentially from the object side, a negative meniscus lens in which its object side surface is shaped into concave at and a positive meniscus lens in which its image side surface is shaped into convex. The third lens group Gr3 is structured with, sequentially from the object side, an aperture diaphragm SA, a biaspheric biconvex positive lens (the third-first lens G31), a biaspheric negative meniscus lens (the third-second lens G32) in which its image side surface is shaped into concave, a light amount adjusting device St, and a biaspheric biconcave negative lens (the third-third lens G33). The fourth lens group Gr4 is structured with a single lens of a biaspheric positive meniscus lens in which its image side surface is shaped into convex.

In the fifth embodiment (FIG. 5), each lens group is structured as follows. The first lens group Gr1 is structured with, sequentially from the object side, a negative meniscus lens in which its image side surface is configured with an aspheric surface and the image side surface is shaped into concave, a prism PR and a plano-convex lens in which its image side surface is shaped in convex, and the plane surface at the object side of the plano-convex lens is cemented with the prism. The second lens group Gr2 is structured with a single lens of a negative meniscus lens in which its object side surface is shaped into concave. The third lens group Gr3 is structured with, sequentially from the object side, an aperture diaphragm SA, a biaspheric biconvex positive lens (the third-first lens G31), a biaspheric negative meniscus lens (the third-second lens G32) in which its image side surface is shaped into concave, a light amount adjusting device St, and a biaspheric negative meniscus lens (the third-third lens G33) in which its object side surface is shaped in concave. The fourth lens group Gr4 is structured with a single lens of a biaspheric positive meniscus lens in which its image side is shaped in convex.

The zoom lens system ZL of each embodiment is structured as a bending optical system having a prism PR (as a bending means) to bend an optical axis AX by an approximate 90° in the first lens group Gr1. The Prism PR includes a reflecting surface RL to bend a light flux by an approximate 90°, for example, as shown in FIG. 13. With this reflecting surface RL, an optical path is bent so that the zoom lens system ZL is used as a bending optical system. At this time, a light flux is reflected so as to bend an optical axis by 90° (namely, 90° or substantially 90°). Thus, if the reflecting surface RL to bend an optical path is provided on the optical path of the zoom lens system ZL, the degree of freedom for arranging the image pickup device LU increase. In addition, with an arrangement to change the size of the image pickup device LU in the thickness direction, and it becomes possible to attain to thin apparently the thickness of the image pickup device LU. Here, the position to bend an optical path is not limited to on the way of the zoom lens system ZL, but also the position is arranged at the fore side or the rear side. With a proper bending of an optical path, it becomes possible to effectively attain to thin apparently the thickness of the digital device CU into which the image pickup device LU is installed or to make it compact.

In each embodiment, the prism PR being a reflecting element is used as a bending means to bend an optical axis AX, and is structured to reflect a light flux with its one reflecting surface RL such that the optical axis AX of a zoom lens system ZL is bent about 90°. Not only prisms (rectangular prism etc.) but also, for example, mirrors (flat mirror etc.) may be employed as the reflecting element to constitute the reflecting surface RL. Further, the bending means may have two or more reflecting surfaces. That is, a reflecting element to reflect a light flux with two or more reflecting surfaces so as to bend the optical axis AX of a zoom lens system ZL by about 90° may be employed. The optical action to bend an optical path is not limited to reflection, but also is refraction, diffraction, or a combination of those. That is, the bending means may have a reflecting surface, a refracting surface, a diffracting surface, or a combination of two or more of these surfaces. Moreover, the prism PR used for each embodiment does not have an optical power, however, the bending means to bend an optical path may have an optical power. For example, if a part of the optical power of a zoom lens system ZL is made to be shared by a reflecting surface, a light entering side surface, and a light exiting side surface of a prism and a reflecting surface of a mirror, it becomes possible to reduce the burden of an optical power by lens elements and to improve the optical performance of the lens elements.

EXAMPLE

Hereafter, the structures of the zoom lens system to carry out the present invention are explained still more concretely with reference to construction data. Examples 1 to 5 given here are numerical examples corresponding to the abovementioned first to fifth embodiments respectively, and lens constitution figures (FIGS. 1 to 5) representing the first to fifth embodiments show the lens constitutions and zoom movements of the corresponding Examples 1 to 5 respectively.

The construction data of each example show, in the order from the left-hand side column, surface number, radius of curvature r (mm), axial spacing d (mm), refractive index nd for d line, Abbe number vd for d line, and effective radius (mm). The surface marked with * is an aspheric surface and is defined by the following formula (AS) representing the surface shape of an aspheric surface. Here, in the aspheric surface data of each example, the coefficient of a term which does not have a notation is 0, and with regard to all the data, $E-n = \times 10^{-n}$.

$$X(H) = (C0 \cdot H^2)/\{1 + \sqrt{(1 - \epsilon \cdot C0^2 \cdot H^2)}\} + \Sigma(Aj \cdot H^j) \qquad (AS)$$

Here, in the formula (AS),

X(H) represents an amount of displacement in the optical axis AX direction at the location of a height of H (on the basis of the apex of a surface), H represents a height in a direction vertical to the optical axis AX, C0 represents a paraxial curvature (=1/r), $\epsilon$ represents a secondary curved surface parameter, and Aj represents a j-th order aspheric surface coefficient.

As various data, zoom ratio, focal length (mm), f number, view angle (2ω, °), image height (mm), lens overall length (mm), BF (mm), and variable surface spacing (mm) are shown, and as zoom lens group data, focal length (mm) of each lens group is shown. However, BF used here represents the distance from the image side surface of a cover glass (corresponding to plane parallel plate PT) to an image surface. Further, the values corresponding to the conditional expressions of each example are shown in Table 1.

FIGS. 6 to 10 are aberration diagrams corresponding to Example 1 to Example 5, respectively, and at a wide angle end (W), an intermediate point, and a telephoto end (T), some aberrations (in the order from the left, spherical aberration, astigmatism and distortion aberrations) are indicated. In FIGS. 6 to 10, FNO is F number and Y' (mm) is the maximum image height (corresponding to a distance from the optical axis AX) on a light receiving surface SS of image pickup sensor SR. In the spherical-aberration diagrams, solid lines d represent spherical aberration (mm) for d line, and broken lines SC represent sine condition dissatisfying amount (mm). In the astigmatic diagram, broken lines DM represent astigmatism (mm) for d line on Meridional surface and solid lines DS represent astigmatism (mm) for d line on Sagital surface. Further, in the distortion aberration diagram, solid lines represent a distortion (%) for d line.

Example 1

Unit mm
Face data

| Face No. | r | d | nd | vd | Effective radius |
|---|---|---|---|---|---|
| Object | ∞ | ∞ | | | |
| 1 | 1000.000 | 0.500 | 1.88300 | 40.80 | 3.57 |
| 2 | 16.961 | 0.569 | | | 3.33 |

-continued

| | | | | |
|---|---|---|---|---|
| 3 | ∞ | 4.880 | 1.90366 | 31.32 | 3.24 |
| 4 | ∞ | variable | | | 2.35 |
| 5* | −6.483 | 0.500 | 1.77250 | 49.36 | 2.1 |
| 6 | 25.361 | 0.010 | 1.51400 | 42.83 | 2.07 |
| 7 | 25.361 | 0.844 | 1.90366 | 31.32 | 2.07 |
| 8 | −17.396 | variable | | | 2.05 |
| 9 (SA) | ∞ | 0.000 | | | 1.41 |
| 10* | 2.529 | 1.394 | 1.51835 | 70.30 | 1.44 |
| 11* | −7.029 | 0.509 | | | 1.44 |
| 12* | 39.270 | 0.700 | 1.63550 | 23.89 | 1.32 |
| 13* | 5.349 | 0.452 | | | 1.24 |
| 14 (ST) | ∞ | 2.192 | | | 1.28 |
| 15* | −5.580 | 0.700 | 1.53048 | 55.72 | 1.48 |
| 16* | 8.187 | variable | | | 1.72 |
| 17* | −5.217 | 1.260 | 1.60280 | 28.30 | 2.38 |
| 18* | −3.004 | 0.200 | | | 2.68 |
| 19 | ∞ | 0.500 | 1.51680 | 64.20 | 4 |
| 20 | ∞ | BF | | | 4 |
| Image | ∞ | | | | |

Aspheric surface data

Fifth face $\epsilon = 1.0000$,
A4 = 0.22366454E−04, A6 = −0.26922616E−04,
A8 = 0.96549515E−05, A10 = −0.87532631E−06

10th face $\epsilon = 1.0000$,
A4 = −0.54674344E−02, A6 = −0.22822274E−02,
A8 = 0.39814022E−03, A10 = −0.33631805E−03

11th face $\epsilon = 1.0000$,
A4 = −0.15494243E−01, A6 = 0.47796762E−02,
A8 = −0.17300419E−02, A10 = 0.10922749E−03

12th face $\epsilon = 1.0000$,
A4 = −0.42224735E−01, A6 = 0.17850083E−01,
A8 = −0.21172455E−02, A10 = 0.31592500E−03

13th face $\epsilon = 1.0000$,
A4 = −0.26197753E−01, A6 = 0.21131043E−01,
A8 = −0.40775413E−02, A10 = 0.18781265E−02

15th face $\epsilon = 1.0000$,
A4 = −0.58895103E−01, A6 = 0.96176580E−02,
A8 = 0.40498591E−02, A10 = −0.86990107E−03

16th face $\epsilon = 1.0000$,
A4 = −0.44606249E−01, A6 = 0.13271668E−01,
A8 = −0.10328750E−02, A10 = 0.36356018E−04

17th face $\epsilon = 1.0000$,
A4 = −0.77051130E−02, A6 = 0.15316800E−02,
A8 = 0.65919947E−04, A10 = −0.27466513E−04

18th face $\epsilon = 1.0000$,
A4 = −0.42960861E−02, A6 = 0.60861974E−02,
A8 = −0.15159029E−02, A10 = 0.28050520E−03,
A12 = −0.29982584E−04, A14 = 0.13218726E−05

Various data

Zoom ratio 2.748

| | (W) Wide angle | (M) Intermediate | (T) Telephoto |
|---|---|---|---|
| Focal length | 5.00 | 8.74 | 13.74 |
| F number | 3.55 | 5.14 | 6.98 |
| View angle (2ω) | 61.85 | 35.28 | 22.9 |
| Image height | 2.88 | 2.88 | 2.88 |
| Lens overall length | 22.759 | 22.759 | 22.759 |
| BF | 0.498 | 0.497 | 0.497 |
| d4 | 1.025 | 2.462 | 1.025 |
| d8 | 5.313 | 1.599 | 0.400 |
| d16 | 0.715 | 2.992 | 5.627 |

Zoom lens group data

| Lens group | Start face | Focal length |
|---|---|---|
| 1 | 1 | −19.544 |
| 2 | 5 | −17.408 |
| 3 | 9 | 4.659 |
| 4 | 17 | 9.674 |

Example 2

Unit mm
Face data

| Face No. | r | d | nd | vd | Effective radius |
|---|---|---|---|---|---|
| Object | ∞ | ∞ | | | |
| 1 | 158.008 | 0.480 | 1.89188 | 36.05 | 3.62 |
| 2 | 9.551 | 0.792 | | | 3.29 |
| 3 | ∞ | 4.800 | 1.90366 | 31.32 | 3.23 |
| 4 | ∞ | variable | | | 2.54 |
| 5* | 17.808 | 0.560 | 1.68863 | 52.90 | 2.36 |
| 6* | 2.932 | 0.403 | | | 2.16 |
| 7 | 5.026 | 0.975 | 1.90366 | 31.32 | 2.20 |
| 8 | 27.375 | variable | | | 2.13 |
| 9 (SA) | ∞ | 0.000 | | | 1.35 |
| 10 | 2.198 | 2.149 | 1.49700 | 81.61 | 1.39 |
| 11 | −13.282 | 0.325 | | | 1.2 |
| 12* | 5.736 | 0.800 | 1.82114 | 24.06 | 1.16 |
| 13* | 2.487 | 0.460 | | | 1.2 |
| 14 (ST) | ∞ | 2.767 | | | 1.26 |
| 15* | −14.910 | 0.560 | 1.60280 | 28.30 | 1.63 |
| 16* | 106.472 | variable | | | 2.02 |
| 17* | −28.462 | 1.387 | 1.60280 | 28.30 | 2.55 |
| 18* | −5.000 | 0.160 | | | 2.93 |
| 19 | ∞ | 0.400 | 1.51680 | 64.20 | 4 |
| 20 | ∞ | BF | | | 4 |
| Image | ∞ | | | | |

Aspheric surface data

5th face $\epsilon = 1.0000$,
A4 = −0.10783264E−01, A6 = 0.20334107E−02,
A8 = −0.24238114E−03, A10 = 0.13837928E−04

6th face $\epsilon = 1.0000$,
A4 = −0.15886325E−01, A6 = 0.22654142E−02,
A8 = −0.34841055E−03, A10 = 0.17447863E−04

12th face $\epsilon = 1.0000$,
A4 = −0.54015427E−01, A6 = −0.10465479E−01,
A8 = 0.21494257E−02, A10 = −0.16254723E−02

13th face $\epsilon = 1.0000$,
A4 = −0.64537266E−01, A6 = −0.32677892E−02,
A8 = 0.28959871E−02, A10 = −0.55365793E−03

15th face $\epsilon = 1.0000$,
A4 = −0.41108036E−01, A6 = 0.12930166E−02,
A8 = 0.30205648E−03, A10 = −0.12263764E−02

-continued

16th face $\epsilon = 1.0000$,
A4 = −0.35882742E−01, A6 = 0.57373086E−02,
A8 = −0.14053482E−02, A10 = −0.14801384E−03,
A12 = 0.38478227E−04

17th face $\epsilon = 1.0000$,
A4 = −0.80081786E−02, A6 = −0.36605635E−02,
A8 = 0.98203137E−03, A10 = −0.10116623E−03,
A12 = −0.71195649E−05, A14 = 0.10214687E−05

18th face $\epsilon = 1.0000$,
A4 = 0.21047934E−01, A6 = −0.52203535E−02,
A8 = 0.14059616E−02, A10 = −0.19764666E−03,
A12 = 0.12554431E−04, A14 = −0.31246691E−06

Various data

Zoom ratio 2.89

|  | (W) Wide angle | (M) Intermediate | (T) Telephoto |
|---|---|---|---|
| Focal length | 4.93 | 8.52 | 14.25 |
| F number | 3.60 | 5.17 | 7.64 |
| View angle (2ω) | 68.84 | 41.07 | 26.34 |
| Image height | 2.88 | 2.88 | 2.88 |
| Lens overall length | 23.6 | 23.6 | 23.6 |
| BF | 0.399 | 0.399 | 0.399 |
| d4 | 0.626 | 2.487 | 0.253 |
| d8 | 5.319 | 0.866 | 0.287 |
| d16 | 0.240 | 2.831 | 5.645 |

Zoom lens group data

| Lens group | Start face | Focal length |
|---|---|---|
| 1 | 1 | −11.415 |
| 2 | 5 | −27.132 |
| 3 | 9 | 5.071 |
| 4 | 17 | 9.843 |

Example 3

Unit mm
Face data

| Face No. | r | d | nd | vd | Effective radius |
|---|---|---|---|---|---|
| Object | ∞ | ∞ |  |  |  |
| 1 | 20.499 | 0.500 | 1.88300 | 40.80 | 3.65 |
| 2 | 7.519 | 1.000 |  |  | 3.28 |
| 3 | ∞ | 4.880 | 1.90366 | 31.32 | 3.19 |
| 4 | ∞ | variable |  |  | 2.34 |
| 5* | −6.388 | 0.500 | 1.77250 | 49.36 | 2.09 |
| 6 | 7.990 | 0.010 | 1.5140 | 42.83 | 2.07 |
| 7 | 7.990 | 1.033 | 1.90366 | 31.32 | 2.07 |
| 8 | −17.207 | variable |  |  | 2.05 |
| 9 (SA) | ∞ | 0.000 |  |  | 1.39 |
| 10 | 2.428 | 1.586 | 1.49700 | 81.61 | 1.43 |
| 11 | −7.354 | 0.363 |  |  | 1.4 |
| 12* | −34.785 | 0.700 | 1.63550 | 23.89 | 1.31 |
| 13* | 8.201 | 0.477 |  |  | 1.31 |
| 14 (ST) | ∞ | 2.668 |  |  | 1.34 |
| 15* | −4.520 | 0.700 | 1.53048 | 55.72 | 1.51 |
| 16* | 19.118 | variable |  |  | 1.82 |
| 17* | −6.659 | 1.299 | 1.60280 | 28.30 | 2.53 |
| 18* | −3.136 | 0.200 |  |  | 2.85 |
| 19 | ∞ | 0.500 | 1.51680 | 64.20 | 4 |
| 20 | ∞ | BF |  |  | 4 |
| Image | ∞ |  |  |  |  |

Aspheric surface data

5th face $\epsilon = 1.0000$,
A4 = −0.89951111E−04, A6 = 0.11825219E−04,
A8 = −0.39586275E−05, A10 = 0.40470829E−06

12th face $\epsilon = 1.0000$,
A4 = −0.36204412E−01, A6 = 0.13425046E−02,
A8 = 0.84209913E−03, A10 = −0.45278290E−05

13th face $\epsilon = 1.0000$,
A4 = −0.28813056E−01, A6 = 0.65696774E−02,
A8 = −0.28897680E−03, A10 = 0.47934063E−03

15th face $\epsilon = 1.0000$,
A4 = −0.56638179E−01, A6 = 0.10094347E−02,
A8 = 0.21079106E−02, A10 = 0.97603176E−04

16th face $\epsilon = 1.0000$,
A4 = −0.39790895E−01, A6 = 0.69130197E−02,
A8 = −0.21312615E−03, A10 = 0.43475116E−04

17th face $\epsilon = 1.0000$,
A4 = −0.44005716E−02, A6 = 0.14126293E−02,
A8 = −0.11386831E−04, A10 = −0.21513702E−04

18th face $\epsilon = 1.0000$,
A4 = 0.52278180E−02, A6 = 0.17967416E−02,
A8 = −0.18334812E−03, A10 = 0.32896371E−04,
A12 = −0.65852086E−05, A14 = 0.40258351E−06

Various data

Zoom ratio 2.748

|  | (W) Wide angle | (M) Intermediate | (T) Telephoto |
|---|---|---|---|
| Focal length | 4.40 | 7.70 | 12.09 |
| F number | 3.55 | 5.16 | 6.94 |
| View angle (2ω) | 67.81 | 39.84 | 25.92 |
| Image height | 2.88 | 2.88 | 2.88 |
| Lens overall length | 23.9 | 23.9 | 23.9 |
| BF | 0.498 | 0.498 | 0.498 |
| d4 | 1.080 | 2.760 | 1.033 |
| d8 | 5.418 | 1.345 | 0.400 |
| d16 | 0.488 | 2.882 | 5.553 |

Zoom lens group data

| Lens group | Start face | Focal length |
|---|---|---|
| 1 | 1 | −13.694 |
| 2 | 5 | −21.465 |
| 3 | 9 | 4.794 |
| 4 | 17 | 8.638 |

Example 4

Unit mm
Face data

| Face No. | r | d | nd | vd | Effective radius |
|---|---|---|---|---|---|
| Object | ∞ | ∞ | | | |
| 1 | 550.907 | 0.500 | 1.90366 | 31.32 | 3.59 |
| 2 | 16.234 | 0.582 | | | 3.34 |
| 3 | ∞ | 4.850 | 1.84666 | 23.78 | 3.25 |
| 4 | ∞ | variable | | | 2.31 |
| 5 | −6.202 | 0.400 | 1.77250 | 49.62 | 2.09 |
| 6 | −113.562 | 0.010 | 1.51400 | 42.83 | 2.07 |
| 7 | 25.361 | 0.844 | 1.90366 | 31.32 | 2.07 |
| 8 | −15.233 | variable | | | 2.05 |
| 9 (SA) | ∞ | 0.000 | | | 1.36 |
| 10* | 2.420 | 1.394 | 1.51835 | 70.30 | 1.4 |
| 11* | −3.533 | 0.100 | | | 1.37 |
| 12* | 376.705 | 0.500 | 1.80542 | 26.12 | 1.31 |
| 13* | 4.983 | 0.569 | | | 1.22 |
| 14 (ST) | ∞ | 2.335 | | | 1.25 |
| 15* | −3.089 | 0.700 | 1.53048 | 55.72 | 1.38 |
| 16* | 34.220 | variable | | | 1.67 |
| 17* | −5.153 | 1.314 | 1.63550 | 23.89 | 2.36 |
| 18* | −2.996 | 0.200 | | | 2.7 |
| 19 | ∞ | 0.500 | 1.51680 | 64.20 | 4 |
| 20 | ∞ | BF | | | 4 |
| Image | ∞ | | | | |

Aspheric surface data

10th face $\epsilon = 1.0000$,
A4 = −0.45839736E−02, A6 = −0.32455261E−02,
A8 = 0.52699352E−03, A10 = −0.51553810E−03

11th face $\epsilon = 1.0000$,
A4 = 0.10358764E−01, A6 = 0.17898672E−02,
A8 = −0.22228635E−02, A10 = 0.24799805E−03

12th face $\epsilon = 1.0000$,
A4 = −0.22625464E−01, A6 = 0.19048604E−01,
A8 = −0.42833710E−02, A10 = 0.82977289E−03

13th face $\epsilon = 1.0000$,
A4 = −0.24223335E−01, A6 = 0.22378538E−01,
A8 = −0.48140524E−02, A10 = 0.17157953E−02

15th face $\epsilon = 1.0000$,
A4 = −0.40480824E−01, A6 = 0.94684944E−02,
A8 = 0.11609029E−02, A10 = −0.68836331E−03

16th face $\epsilon = 1.0000$,
A4 = −0.24357422E−01, A6 = 0.95682125E−02,
A8 = −0.89582580E−03, A10 = −0.12486802E−04

17th face $\epsilon = 1.0000$,
A4 = −0.1554523E−01, A6 = 0.36143966E−02,
A8 = −0.37156578E−03, A10 = 0.73444153E−05

18th face $\epsilon = 1.0000$,
A4 = −0.92382060E−02, A6 = 0.71904159E−02,
A8 = −0.17590264E−02, A10 = 0.29522836E−03,
A12 = −0.29072357E−04, A14 = 0.12573336E−05

Various data

Zoom ratio 2.748

| | (W) Wide angle | (M) Intermediate | (T) Telephoto |
|---|---|---|---|
| Focal length | 4.84 | 8.47 | 13.31 |
| F number | 3.55 | 5.12 | 6.94 |
| View angle (2ω) | 64.2 | 36.25 | 23.59 |
| Image height | 2.88 | 2.88 | 2.88 |
| Lens overall length | 22.01 | 22.01 | 22.01 |
| BF | 0.498 | 0.498 | 0.498 |
| d4 | 0.964 | 2.282 | 0.838 |
| d8 | 5.084 | 1.533 | 0.400 |
| d16 | 0.751 | 2.984 | 5.561 |

Zoom lens group data

| Lens group | Start face | Focal length |
|---|---|---|
| 1 | 1 | −18.519 |
| 2 | 5 | −16.897 |
| 3 | 9 | 4.529 |
| 4 | 17 | 9.107 |

Example 5

Unit mm
Face data

| Face No. | r | d | nd | vd | Effective radius |
|---|---|---|---|---|---|
| Object | ∞ | ∞ | | | |
| 1 | 10000.000 | 0.400 | 1.88300 | 40.80 | 3.55 |
| 2* | 13.153 | 0.650 | | | 3.31 |
| 3 | ∞ | 4.850 | 1.90366 | 31.32 | 3.23 |
| 4 | ∞ | 0.568 | 1.94595 | 17.98 | 2.4 |
| 5 | ∞ | variable | | | 2.33 |
| 6 | −6.405 | 0.400 | 1.77250 | 49.62 | 1.96 |
| 7 | ∞ | variable | | | 1.9 |
| 8 (SA) | ∞ | 0.000 | | | 1.3 |
| 9* | 2.280 | 1.338 | 1.51835 | 70.30 | 1.33 |
| 10* | −3.940 | 0.143 | | | 1.3 |
| 11* | 38.772 | 0.500 | 1.80542 | 26.12 | 1.24 |
| 12* | 4.844 | 0.508 | | | 1.16 |
| 13 (ST) | ∞ | 2.026 | | | 1.19 |
| 14* | −2.025 | 0.650 | 1.53048 | 55.72 | 1.31 |
| 15* | −8.122 | variable | | | 1.63 |
| 16* | −6.474 | 1.480 | 1.63550 | 23.89 | 2.4 |
| 17* | −3.155 | 0.200 | | | 2.77 |
| 18 | ∞ | 0.500 | 1.51680 | 64.20 | 4 |
| 19 | ∞ | BF | | | 4 |
| Image | ∞ | | | | |

Aspheric surface data

2nd face $\epsilon = 1.0000$,
A4 = 0.14853671E−04, A6 = −0.83612910E−05,
A8 = 0.17242335E−06

9th face $\epsilon = 1.0000$,
A4 = −0.50481359E−02, A6 = −0.26394225E−02,
A8 = 0.48729360E−03, A10 = −0.50031918E−03

10th face $\epsilon = 1.0000$,
A4 = 0.97008297E−02, A6 = 0.42758581E−02,
A8 = −0.33734408E−02, A10 = 0.42831913E−03

-continued

11th face $\epsilon = 1.0000$,
A4 = −0.20918539E−01, A6 = 0.20571155E−01,
A8 = −0.51073310E−02, A10 = 0.99656907E−03

12th face $\epsilon = 1.0000$,
A4 = −0.21816354E−01, A6 = 0.22669864E−01,
A8 = −0.41402705E−02, A10 = 0.20167967E−02

14th face $\epsilon = 1.0000$,
A4 = −0.27743890E−01, A6 = 0.77878417E−02,
A8 = 0.58772737E−02, A10 = −0.19293649E−02

15th face $\epsilon = 1.0000$,
A4 = −0.13932055E−01, A6 = 0.69542126E−02,
A8 = 0.32954578E−03, A10 = −0.21862348E−03

16th face $\epsilon = 1.0000$,
A4 = −0.71447179E−02, A6 = 0.18036243E−02,
A8 = −0.32308797E−03, A10 = 0.13188466E−04

17th face $\epsilon = 1.0000$,
A4 = 0.15542640E−02, A6 = 0.25271854E−02,
A8 = −0.41550046E−03, A10 = 0.31049823E−04,
A12 = −0.19584366E−05, A14 = 0.12692147E−06

Various data

Zoom ratio 2.746

|  | (W) Wide angle | (M) Intermediate | (T) Telephoto |
|---|---|---|---|
| Focal length | 4.80 | 8.39 | 13.18 |
| F number | 3.55 | 5.03 | 6.90 |
| View angle (2ω) | 64.34 | 36.56 | 23.89 |
| Image height | 2.88 | 2.88 | 2.88 |
| Lens overall length | 21.41 | 21.41 | 21.41 |
| BF | 0.499 | 0.499 | 0.499 |
| D5 | 0.975 | 1.955 | 0.662 |
| D7 | 4.952 | 1.826 | 0.400 |
| d15 | 0.780 | 2.926 | 5.644 |

Zoom lens group data

| Lens group | Start face | Focal length |
|---|---|---|
| 1 | 1 | −65.336 |
| 2 | 6 | −11.319 |
| 3 | 8 | 4.481 |
| 4 | 16 | 8.253 |

TABLE 1

| Conditional Expression | Example 1 | Example 2 | Example 3 | Example 4 | Example 5 |
|---|---|---|---|---|---|
| (1) | 0.529 | 0.605 | 0.715 | 0.600 | 0.528 |
| (2) | 0.932 | 1.188 | 1.090 | 0.936 | 0.934 |
| (3) | 1.598 | 0.278 | 1.521 | 1.821 | 1.310 |
| (4) | 0.760 | 0.395 | 1.617 | 0.974 | 0.778 |
| (5) | 1.319 | 3.417 | 1.423 | 1.172 | 1.178 |
| (6) | −3.909 | −2.675 | −3.112 | −3.826 | −3.110 |
| (7) | 1.123 | 0.421 | 0.638 | 1.096 | 5.772 |

(1): L3/fw, (2): f3/fw, (3): f32/f33,
(4): (CR1 − CR2)/(CR1 + CR2), (5): |f33/f3|, (6): f11/fw,
(7): f1/f2

What is claimed is:

1. A zoom lens system comprising, in order from an object side:
    a first lens group having a negative optical power,
    a second lens group having a negative optical power,
    a third lens group having a positive optical power, and,
    a fourth lens group having a positive optical power,
    wherein the position of the first lens group is made fixed during zooming, and the third lens group comprises three single lenses including, in order from the object side, a third-first lens being a single lens having a positive optical power, a third-second lens being a single lens having a negative optical power and a third-third lens being a single lens having a negative optical power, and
    wherein the following conditional expression (1) is satisfied:

$$0.4 < L3/fw < 1.2 \tag{1}$$

where L3 represents the axial air gap distance between the third-second lens and the third-third lens and fw represents the focal length of the entire system of the zoom lens system at a wide angle end position.

2. The zoom lens system described in claim 1, wherein the following conditional expression (2) is satisfied:

$$0.5 < f3/fw < 1.5 \tag{2}$$

where f3 represents the focal length of the third lens group.

3. The zoom lens system described in claim 2, wherein the third-second lens is a biaspheric lens.

4. The zoom lens system described in claim 2, wherein the following conditional expression (3) is satisfied:

$$0.2 < f32/f33 < 2 \tag{3}$$

where f32 represents the focal length of the third-second lens, and f33 represents the focal length of the third-third lens.

5. The zoom lens system described in claim 2, wherein the following conditional expression (4) is satisfied:

$$0.3 < (CR1 - CR2)/(CR1 + CR2) < 2.1 \tag{4}$$

where CR1 represents the radius of curvature at the object side of the third-second lens, and CR2 represents the radius of curvature at the image side of the third-second lens.

6. The zoom lens system described in claim 2, wherein the following conditional expression (5) is satisfied:

$$0.5 < |f33/f3| < 5 \tag{5}$$

where f33 represents the focal length of the third-third lens, and f3 represents the focal length of the third lens group.

7. The zoom lens system described in claim 1, wherein the third-second lens is a biaspheric lens.

8. The zoom lens system described in claim 1, wherein the first lens group includes a reflecting surface to bend a light flux by almost 90°.

9. The zoom lens system described in claim 1, wherein the position of the fourth lens group is fixed during zooming.

10. The zoom lens system described in claim 1, wherein the following conditional expression (3) is satisfied:

$$0.2 < f32/f33 < 2 \tag{3}$$

where f32 represents the focal length of the third-second lens, and f33 represents the focal length of the third-third lens.

11. The zoom lens system described in claim 1, wherein the following conditional expression (4) is satisfied:

$$0.3 < (CR1 - CR2)/(CR1 + CR2) < 2.1 \tag{4}$$

where CR1 represents the radius of curvature at the object side of the third-second lens, and CR2 represents the radius of curvature at the image side of the third-second lens.

12. The zoom lens system described in claim 1, wherein the following conditional expression (5) is satisfied:

$$0.5<|f33/f3|<5 \qquad (5)$$

where f33 represents the focal length of the third-third lens, and f3 represents the focal length of the third lens group.

13. The zoom lens system described in claim 1, wherein the following conditional expression (6) is satisfied:

$$-4<f11/fw<-2 \qquad (6)$$

where f11 represents the focal length of the negative lens in the first lens group, and fw represents the focal length of the entire system at the wide angle end position.

14. The zoom lens system described in claim 1, wherein the following conditional expression (7) is satisfied:

$$0.5<f1/f2<7 \qquad (7)$$

where f1 represents the focal length of the first lens group, and f2 represents the focal length of the second lens group.

15. An image pickup apparatus, comprising:
a zoom lens system for forming an optical image of an object, and
an image pickup element for converting the optical image into an electric signal,
wherein the zoom lens system comprises, in order from an object side:
a first lens group having a negative optical power,
a second lens group having a negative optical power,
a third lens group having a positive optical power, and,
a fourth lens group having a positive optical power,
wherein the position of the first lens group is fixed during zooming, and the third lens group comprises three single lenses including, in order from the object side, a third-first lens being a single lens having a positive optical power, a third-second lens being a single lens having a negative optical power and a third-third lens being a single lens having a negative optical power, and
wherein the following conditional expression (1) is satisfied:

$$0.4<L3/fw<1.2 \qquad (1)$$

where L3 represents the axial air gap distance between the third-second lens and the third-third lens and fw represents the focal length of the entire system of the zoom lens system at a wide angle end position.

16. The image pickup apparatus described in claim 15, further comprising:
a light amount adjusting device in the third lens group.

17. The image pickup apparatus described in claim 16, wherein the light amount adjusting device is arranged between the third-second lens and the third-third lens.

18. The image pickup apparatus described in claim 15, wherein the following conditional expression (2) is satisfied:

$$0.5<f3/fw<1.5 \qquad (2)$$

where f3 represents the focal length of the third lens group and fw represents the focal length of the entire system of the zoom lens system at a wide angle end position.

19. The image pickup apparatus described in claim 15, wherein the third-second lens is a biaspheric lens.

20. The image pickup apparatus described in claim 15, wherein the first lens group includes a reflecting surface to bend a light flux by almost 90°.

* * * * *